W. D. MAYNARD ETAL 3,145,571

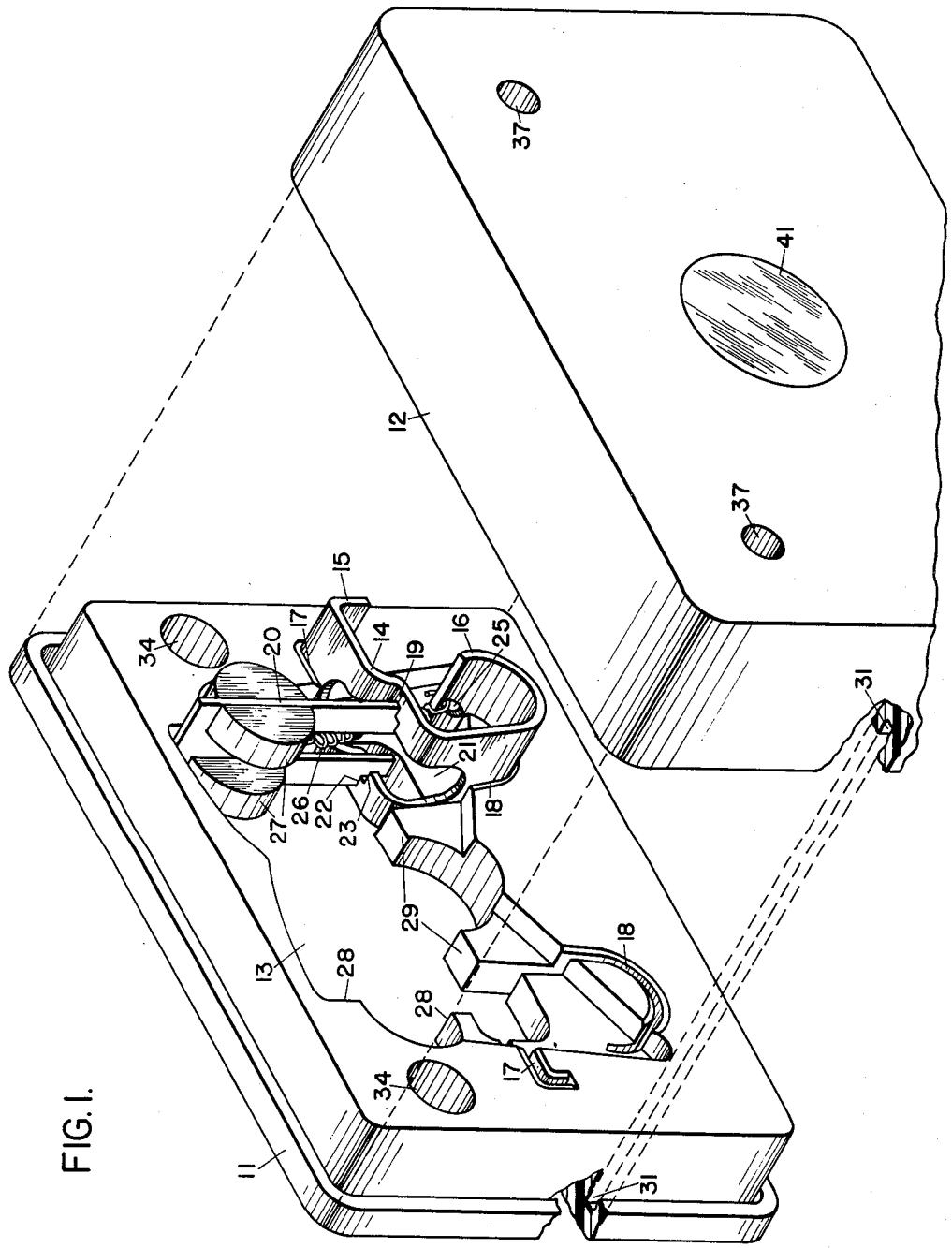
Aug. 25, 1964  W. D. MAYNARD ETAL  3,145,571
IMPACT DETECTOR
Filed May 15, 1961  3 Sheets-Sheet 1
FIG. I.
INVENTORS.
W.D. MAYNARD AND
K.W. ABENDROTH
BY
THEIR ATTORNEY Aug. 25, 1964

IMPACT DETECTOR

Filed May 15, 1961

INVENTORS.
W.D. MAYNARD AND
K.W. ABENDROTH

BY

*Forest B. Hitchcock*

THEIR ATTORNEY

Aug. 25, 1964  W. D. MAYNARD ETAL  3,145,571
IMPACT DETECTOR

Filed May 15, 1961  3 Sheets-Sheet 3

*INVENTORS.*
W.D. MAYNARD AND
K.W. ABENDROTH
BY
THEIR ATTORNEY

United States Patent Office 3,145,571
Patented Aug. 25, 1964

3,145,571
IMPACT DETECTOR
Wheeler D. Maynard, Mendon, and Karl W. Abendroth, Rochester, N.Y., assignors to General Signal Corporation
Filed May 15, 1961, Ser. No. 110,128
4 Claims. (Cl. 73—492)

This invention generally relates to devices for detecting excessive acceleration or decelerations and more particularly relates to an impact detector of the type which may be attached to the side of vehicles or other objects to record an excessive impact between two such vehicles caused by the longitudinal movement of at least one of said vehicles.

A particular example of application could be as shown and described herein, wherein impact detectors of the present invention are attached to the side of railroad freight cars which are subject at times to severe impacts due to poor handling when they are shifted around in freight yards and humpyard type of classification yards.

Costly damage may occur to the merchandise which is carried by the freight cars if they are subjected to severe impacts during transportation and a particular object of the present invention is to provide a means for detecting and recording such an impact when it occurs, so that proper responsibility may be placed for damages resulting therefrom.

The impact detector of the present invention comprises, in general, a sealed casing having mounted therein two separate trip mechanisms situated to trip for excessive longitudinal accelerations or decelerations of either direction in one plane, one such trip mechanism for each direction of impact. The casing is mounted on the car and sealed in such a manner that it cannot be removed or tampered with without removing the seals.

The casing is also provided with a peep-hole window so that it can be readily ascertained whether or not either of the trip mechanisms has been tripped during certain movements and operations of the freight car. Thus, upon arrival of the freight car at any certain destination, authorized personnel may inspect the impact detector, record its condition, and remove or replace same if necessary by removing the seals. Provision is also made to reset the trip mechanism once the seal has been removed.

More specifically, each trip mechanism comprises in general an over center device having a pivoted lever arm mounted in a vertical plane in an over center position. Such lever arm is biased in such position by a coil spring of a certain force. The free end of such lever arm is provided with counterweights of a certain mass. Having a known mass held over center by a known spring force, a ratio of weight to spring force can be arrived at that will trip the lever arm at a particular acceleration of the weights caused, for example, by the impact of one freight car bumping into another freight car. As the lever arm moves through center against the pull of the spring, the spring takes over and holds the lever arm and its associated weights in its tripped position where it is clearly visible through the peep-hole window.

A further object of the present invention is the provision of an impact detector which lends itself to economical mass production whereby, if desired, the units may be considered expendable after they have been once tripped.

In structure, the casing comprises a unit of two pieces of molded plastic material each provided with suitable grooves, cutouts, etc. to house and position the trip mechanisms. The trip mechanisms are mostly comprised of stamped and punched out metallic pieces which are mounted and pressed into the grooves and held in position without the use of nuts, bolts, screws or the like. The two pieces of the molded plastic casing suitably termed a base and a cover are fit together in tongue and groove fashion and are suitably cemented together to provide a fully weather and moisture proof casing.

Once assembled, the trip mechanisms within the casing are inaccessible except by means of a special tool inserted through an opening in the bottom of the casing which is normally closed by a plug. In practice, the casing is bolted to the side of the freight car by means of two bolts and nuts, after which the two nuts and the plug are wired together and protected by a seal. The reset opening and the plug may be omitted if the units are made for expendable use.

Further objects, purposes and characteristic features of the present invention are apparent or will be pointed out as the detailed description progresses with reference to the accompanying drawings in which like reference characters refer to like parts and in which:

FIG. 1 is an exploded perspective view of the impact detector of the present invention with certain parts of the mechanism having been omitted to more clearly show the structure;

Figure 7:
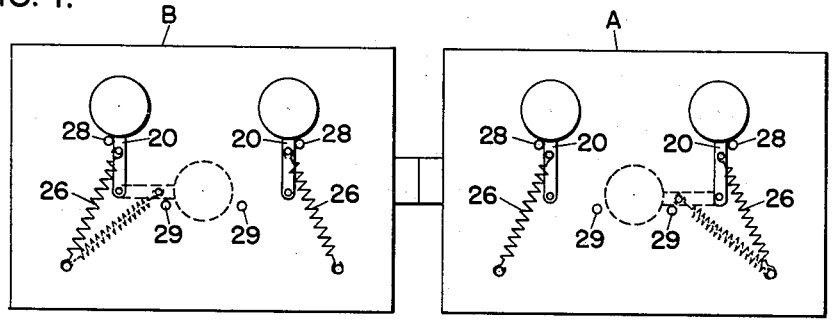
Figure 6:
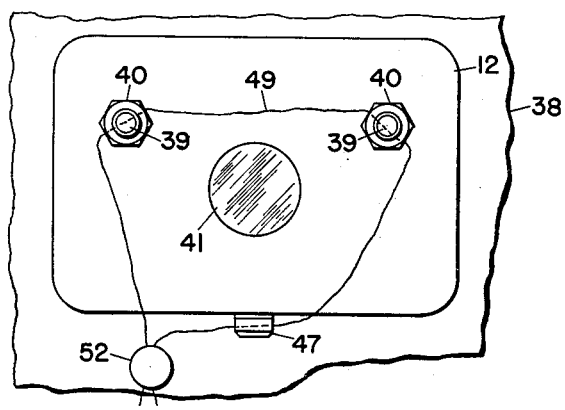

FIG. 6 is a simple front view of the impact detector of the present invention showing the mounting bolts and nuts and the reset opening plug and the manner in which they may be wired together under a seal to prevent unauthorized tampering therewith; and FIG. 7 is a simple diagrammatic illustration showing two objects or vehicles each with an impact detector of the present invention attached thereto.

Referring now more particularly to FIGS. 1 to 4 inclusive, as previously mentioned, the impact detector of the present invention comprises a sealed weather proof casing having two trip mechanisms mounted within. The casing comprises two pieces, conveniently termed a base portion 11 and a cover portion 12, each a molded plastic unit of an opaque color. Each of the casing pieces 11 and 12 is provided with a hollowed out portion 13 to accommodate the trip mechanisms and permit movement thereof.

The two trip mechanisms are identical in structure and each comprises an over center device wherein the movable end of a pivoted lever arm is biased by a coil spring to either of two extreme positions after an arcuate movement of the lever arm through a center position which is defined when the movable end of the lever arm, its pivot point and the anchored end of the coil spring are in alignment. The two trip mechanisms are positioned so that their respective lever arms are normally biased away from each other as more clearly shown in FIG. 2.

It should be pointed out at this time that the perspective view of FIG. 1 is not complete in that only one trip mechanism has been shown mounted therein. The other trip mechanism was omitted to more clearly show the structure of the molded casing members 11 and 12 and the simple manner in which the trip mechanisms are slid into position within the casing members.

Each trip mechanism has a supporting bracket 14 which is substantially C shaped, having its two ends 15 and 16 bent in towards each other. This bracket 14 is mounted in slots 17 and 18 provided in the base portion 11 of the casing in a manner whereby the end 15 lies in the slot 17 and the end 16 lies in the slot 18. The central portion of the bracket 14 and the extreme tip of its end portion 16 are exposed and lie within the cut out portion 13 of the base 11. This exposed central portion of the bracket 14 is provided with a substantially right angled bent in section to form a bearing seat 19 for the lever arm 20. An elongated opening 21 through this central portion of the bracket 14 is provided to facilitate mounting the lever arm 20 on the bracket 14.

The lever arm 20 is in the form of a flat plate having two downwardly extending legs. As shown more clearly in FIG. 1, these legs rest on the bearing seat portion 19 of the bracket 14, one on each side of the opening 21. Notches 22 in the leg portions of the lever arm 20 coact with notches 23 in the bearing seat portion 19 of the bracket 14 to position the lever arm 20 and form a bearing surface therefor. A hole 24 is provided in the upper central portion of the lever arm 20 and another hole 25 is provided in the exposed end portion 16 of the bracket 14. Extending between these two holes 24 and 25 is a tensioned coil spring 26. Thus the lever arm 20 is held against the bearing seat 19 of the bracket 14 by the tension exerted by the coil spring 26. Lead weights 27 are fastened to the free end of the lever arm 20 by any suitable means such as molding, riveting or the like.

As previously mentioned, the trip mechanisms are actually over center devices wherein the pivoted lever arm is positioned for arcuate movement through a center position from one extreme biased position to another extreme biased position. In the present invention, the degree of arcuate movement is considered to be approximately ninety degrees, such as would result from a lever movement from a vertical position to a horizontal position. The vertical position of the lever arm 20 is considered the normal position and is determined by reason of the lever arm 20 bearing against the stop lugs 28 formed around the perimeter of the hollowed out portion 13 of the casing members 11 and 12. Likewise, the horizontal position of the lever arm 20 is the operated position and is determined by reason of the lever arm 20 bearing against the stop lugs 29. In this connection, it will be seen that each lever arm 20 has its individual stop lugs 28 whereas the stop lugs 29 are common to both lever arms 20. This is true because the trip mechanisms are mounted in the casing for operation in opposite directions, as will be explained more fully hereinafter.

In assembly, the trip mechanisms are first mounted in the base member 11 of the casing as explained above and shown in FIGS. 1 and 2. The slots 17 and 18 in the base member are of such a depth as to receive one half of the supporting brackets 14 when inserted therein, leaving the other half of the brackets 14 exposed. When the cover member 12 of the casing is placed over the base member 11, the exposed half of the brackets 14 will enter similar slots 17 and 18 in the cover member 12. Thus, as shown in FIG. 3, the supporting brackets 14 are securely mounted in the two halves of the assembled casing and the hollowed out portions 13 provide a chamber space for arcuate movement of the trip mechanisms.

As previously mentioned, the two casing members 11 and 12 are sealed together when assembled to make the interior of the completed casing weather proof and prevent unauthorized movement of the trip mechanisms. The two casing members are so constructed that the cover member 12 fits over the base member 11 as shown in detail in FIGS. 3 and 4, and overlapping tongue and groove construction as shown at 31 is provided around their contacting perimeters. A suitable cement 32 is applied in the groove portion of the base member 11 prior to assembly which causes the two members to adhere together.

The cover member 12 is provided with two protruding bosses 33 which extend into and through openings 34 in the base member 11. These bosses 33 and openings 34 are similarly provided with overlapping tongue and groove structure 35 and cement 36 to provide a weather proof joint. Thus, the holes 37 extending through the bosses 33 provided for mounting purposes are through the cover member 12 only and do not permit moisture leakage into the chamber 13 housing the trip mechanisms. The complete impact detector may be mounted to the side or frame 38 of a vehicle or the like by means of bolts 39 and nuts 40, the bolts 39 passing through the holes 37.

Figure 4:
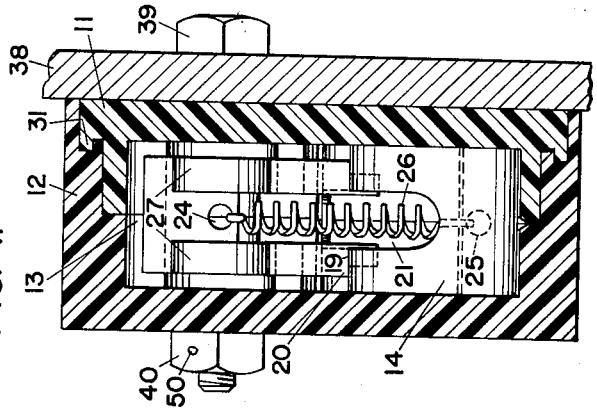
FIG. 4 is a side sectional view of the apparatus shown in FIGS. 2 and 3 substantially as taken on the line 4—4 of FIG. 2 as viewed in the direction of the arrows.
Figure 3:
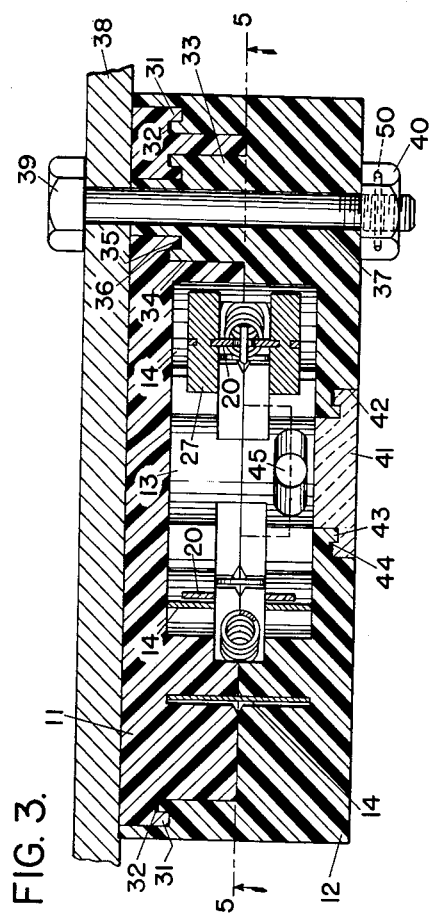
FIG. 3 is a top sectional view of the apparatus shown in FIG. 2 substantially as taken on the line 3—3 of FIG. 2 as viewed in the direction of the arrows and also shows the cover or front casing portion of the impact detector and the manner in which the two casing portions are fitted together and support the trip mechanisms.
Figure 2:
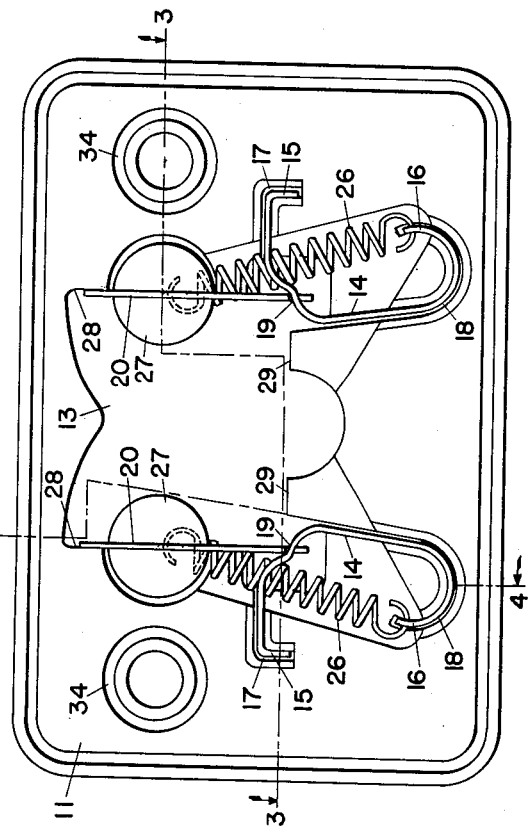
FIG. 2 is a front plan view of the base or back casing portion of the impact detector of the present invention and shows the two trip mechanisms mounted within, in their normal unactuated positions.
Figure 5:
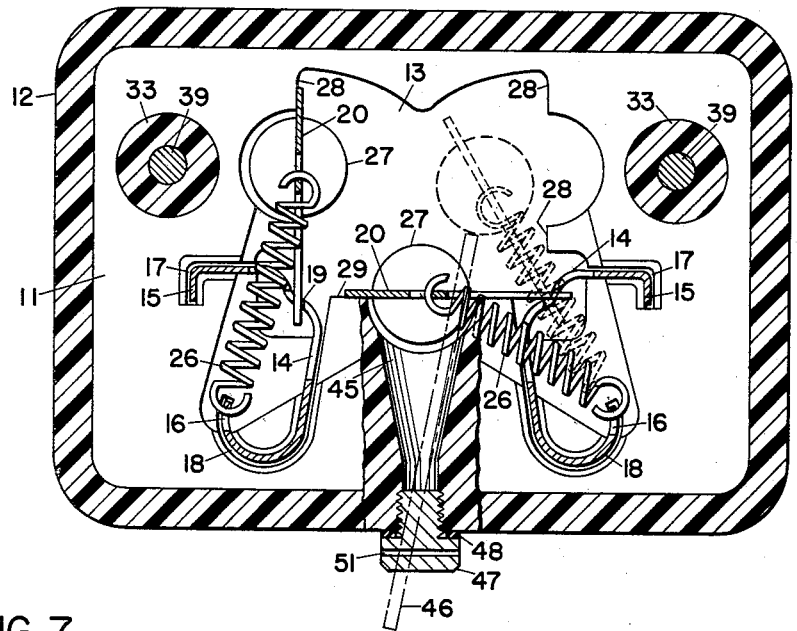
FIG. 5 is a plan sectional view of the apparatus of the impact detector of the present invention substantially as taken on the line 5—5 of FIG. 3 as viewed in the direction of the arrows and shows one of the trip mechanisms in its tripped position and the manner in which such trip mechanism may be reset to its normal unactuated position.

The cover member 12 is also provided with a window 41 mounted in an opening 42 located in its front wall as shown in FIGS. 1 and 3. This window 41 is a molded plastic product made of transparent material and provides a means to visually determine the positions of the trip mechanisms mounted within the casing. When a trip mechanism has been tripped to an operated position as shown in FIG. 5, the weighted portion 27 of its lever arm 20 will be positioned directly behind the window 41. Such weighted portion 27 may be painted a bright color, such as red, to facilitate visability. Both the window 41 and the casing around the opening 42 are provided with overlapping tongue and groove structure 43 and cement 44 to provide a weather tight seal when the window 41 is pressed into position within the opening 42.

Means have been provided to reset the trip mechanisms after they have been tripped to an operated position. Assuming that one of the mechanisms has been tripped as will be explained hereinafter, its lever arm 20 will assume a horizontal position as shown in FIG. 5. An opening 45 is provided through the bottom of the cover portion 12 of the casing, such opening extending up into the hollowed out portion 13 of the casing to a point directly under the weighted portion 27 of the lever arm 20. By inserting a tool or rod 46 (as indicated by the dot and dash lines) up through this opening 45, the lever arm 20 may be lifted upward against the bias of the spring 26. As the lever arm 20 passes through its over center position (as indicated by the dotted lines) the biasing spring 26 will take over and return the lever arm 20 to its normal vertical position. Under normal conditions, the opening 45 is closed and sealed by means of a threaded plug 47 and a rubber washer 48.

When the complete impact detector is installed on a vehicle as previously described, it may be protected against unauthorized manipulation by the use of a wire seal. As shown in FIG. 6, the stranded wire 49 is passed through holes 50 in the mounting bolts and nuts 39 and 40 and also through a hole 51 in the plug 47. The ends of the wire 49 are then brought together and clamped by the lead seal 52. Thus it can be seen that the impact detector cannot be removed from the vehicle or the plug 47 cannot be removed for resetting purposes unless the wire 49 is first removed.

From the above description with reference to the drawings it can be seen that the present invention provides an impact detector comprising two trip mechanisms each of which has a spring biased lever arm 20 normally positioned vertically. In such position, each lever arm 20 is subject to arcuate movement to a horizontal position due to acceleration caused by an impact force received thereby in one longitudinal direction only. In each case, the direction of the impact force received would have to be opposite to the direction in which the lever arm is permitted to move, in order to cause such lever arm to trip. For this reason, the two lever arms 20 of each impact detector are mounted for movement in opposite directions towards each other so that impacts in both directions may be recorded.

As previously mentioned, for the purpose of illustrating the utility of an impact detector of the present invention, it is assumed that such impact detectors are to be mounted on railroad freight cars for the purpose of detecting severe impacts between cars during their movements between destinations. As such, the impact detectors are so constructed with a known ratio of lever weight mass to spring force, so that tripping action of the lever arm only occurs when an impact force of a known degree is received by the vehicle to which the impact detector is attached. Any minor impacts of lesser degree such as ordinarily encountered in the movement of freight cars would not cause enough lever acceleration to trip the lever arms 20.

For the purpose of simple illustration and understanding, there has been shown diagrammatically in FIG. 7 two cars A and B, each with an impact detector attached thereto. Let us now assume that the car B is stationary and the car A is moving in a longitudinal direction from right to left as indicated by the arrow C. If the car A was moving at a speed considered excessive at the moment of impact between the two cars, the impact force would cause a tripping action of one of the trip mechanisms attached to each car. In this particular instance, the lever arm 20 of the right-hand trip mechanism of car A and the lever arm 20 of the left-hand trip mechanism of car B would be tripped to their horizontal positions as indicated by the dotted lines in FIG. 7.

With reference to car A, the deceleration resulting from the impact caused a counterclockwise movement of its associated right-hand lever arm 20 from a vertical position away from its stops 28 to a horizontal position against its stops 29. As the lever arm 20 has now moved through its over center position, the bias of the spring 26 will retain such lever arm 20 in its horizontal position. The left-hand lever arm 20 remained in its normal vertical position because counterclockwise movement thereto was not permitted as this lever arm 20 was bearing against its stops 28 and is mounted for clockwise movement only.

With reference now to car B, the impact received thereby would cause acceleration thereof. Such acceleration would tend to cause clockwise movement of its associated lever arms 20. As the right-hand lever arm 20 is normally bearing against its stops 28, only the left-hand lever arm 20 would be tripped to a horizontal position, as indicated by the dotted lines in FIG. 7.

The impact detector of the present invention also provides that once a trip mechanism has been tripped to a horizontal position it will remain in such positon regardless of any subsequent impact forces it may receive which are transmitted thereto in a longitudinal direction. Assuming that such a force were applied to a horizontal disposed lever arm mass in a direction opposite to the direction of force which originally tripped the lever arm to a horizontal position, its only effect would be to force the lever arm in a longitudinal direction against its bearing surface. The biasing spring 26 would prevent any tendency of the lever arm 20 to rotate towards a vertical position due to vertical vibrations or the like. It should be mentioned, however, that any such opposite direction of force as mentioned above would trip the other lever arm 20 towards a horizontal position where it would rest on top of the first tripped lever arm 20.

It can now be understood that an impact detector of the present invention, when attached to a vehicle, is capable of detecting and recording any severe impacts received by such car while such car was being moved longitudinally in either direction or while such car was stationary. The impact detector may be visually inspected through its window 41 at any time to determine the position of its trip mechanisms. As previously mentioned, it is contemplated that such inspections by authorized personnel would occur at times when the car was leaving a classification yard, was being transferred from one railroad division to another, or had arrived at its destination or the like. If the inspection revealed that one or the other of the trip mechanisms had been tripped to a horizontal position, it would indicate that said car had received severe impacts thereto. Thus, if inspection of the merchandise carried by the car disclosed damage thereto, it could be determined approximately when and where the damage occurred and such information could be recorded.

It should be understood that the impact detectors of the present invention could be manufactured with or without the reset means. When no reset means are provided, the impact detectors are considered expendable. In such cases the wire 49 used to seal the impact detectors to the vehicles would pass through the two mounting bolts 39 and nuts 40 only, the plug 47 having been eliminated.

Although it was chosen to illustrate the impact detector of the present invention in connection with detecting severe impacts to railroad freight cars, it should also be understood that such type of impact detectors could have other uses wherein detection of longitudinal impact forces are involved.

Having shown and described one specific form which the impact detector of the present invention can assume, it is desired to be understood that various other forms, adaptations, alterations and modifications may be made therein, all without departing from the spirit of the invention or the scope of the appending claims.

What we claim is:

1. A device for detecting excessive acceleration or deceleration on a vehicle comprising a casing, a pair of over center trip mechanisms mounted within said casing, said casing comprising a base member and a cover member each of which is hollowed out and provided with grooves to receive and hold said trip mechanisms, each of said trip mechanisms comprising a substantially C-shaped supporting member, a weighted lever arm and a biasing coil spring, the extending legs of said supporting member lying within said grooves with the end of one leg and the central portion of the supporting member exposed in said hollowed out portions of said casing members and said central portion of the supporting member having a bearing seat located substantially midway thereon, said lever arm having one end bearing on said bearing seat of said supporting member and having weights mounted on its free end, said coil spring being fastened between said free end of said lever arm and the exposed end of said supporting member, preformed surfaces within said casing to limit the movements of said lever arm to either of its over center positions, said coil spring acting to bias said lever arm in its last operated over center position, and a window in said casing behind which said lever arm is positioned only when tripped in response to excessive acceleration or deceleration of said vehicle.

2. A detecting device in accordance with claim 1 wherein said base member and said cover member of said casing are each provided with tongue and groove formations and cement around their contacting perimeters to effectively seal said casing against weather and manual manipulation of said trip mechanisms.

3. A detecting device in accordance with claim 2 wherein resetting means are provided which includes an opening in the bottom of said casing to permit access to said trip mechanisms by means of a tool to manually reset said lever arms, a screw plug to normally close said opening, and means fastened by seal to prevent removal of said screw plug.

4. A bi-directional tripping device adapted to trip over center between first and second positions in response to a predetermined force comprising, a hollowed casing having preformed grooves therein and first and second preformed surfaces to define said first and second positions of said tripping device, a substantially C-shaped supporting strip engagedly mounted within said preformed grooves with its central portion and at least a portion of one extending leg thereof exposed within the hollowed portion of said casing and having an elongated transversely centered longitudinal slot extending along the exposed central portion thereof and provided with substantially right angled bent in sections substantially midway along and on opposite sides of said slot to form traversely aligned bearing seats thereon located substantially at the vertices of said bent in sections and having transverse notches therein on opposite sides of said slot at the vertices of said bent in sections, a substantially U-shaped weighted lever arm the legs of which are notched at their respective extending ends whereby each of said legs pivotally bears against said supporting strip at the vertex of said bent in sections with its end extending through said transverse notch, and a coil spring extending through said longitudinal slot and connected between the transverse center of the exposed leg portion of the supporting strip and the transverse center of the central portion of said U-shaped lever arm effective to bias said lever arm in either over-center direction.

References Cited in the file of this patent

UNITED STATES PATENTS

| | | |
|---|---|---|
| 2,018,590 | Adams | Oct. 22, 1935 |
| 2,351,607 | Grant | June 20, 1944 |
| 2,644,601 | Cadman | July 7, 1953 |
| 2,825,297 | Harrison | Mar. 4, 1958 |
| 2,831,183 | Womack | Apr. 15, 1958 |
| 2,854,537 | Sternburgh | Sept. 20, 1958 |
| 2,924,442 | Gray | Feb. 9, 1960 |
| 3,044,306 | Propst | July 17, 1962 |

FOREIGN PATENTS

| | | |
|---|---|---|
| 186,708 | Switzerland | Dec. 16, 1936 |